(12) United States Patent
Chen et al.

(10) Patent No.: US 9,218,370 B2
(45) Date of Patent: Dec. 22, 2015

(54) PROCESSING DATA LOADS

(71) Applicant: International Business Machines Corporation, Armonk, NY (US)

(72) Inventors: Danny Yen-Fu Chen, Austin, TX (US); Craig A. Cormier, Cupertino, CA (US); Fabian F. Morgan, Austin, TX (US); Badri Sridhar, Chennai (IN); Wesley Stevens, Nicholasville, KY (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 13/866,209

(22) Filed: Apr. 19, 2013

(65) Prior Publication Data

US 2014/0317153 A1    Oct. 23, 2014

(51) Int. Cl.
G06F 7/00    (2006.01)
G06F 17/30   (2006.01)

(52) U.S. Cl.
CPC .... *G06F 17/30292* (2013.01); *G06F 17/30595* (2013.01)

(58) Field of Classification Search
CPC ............... G06F 17/30595; G06F 17/30557; G06F 17/30056
See application file for complete search history.

(56) References Cited

U.S. PATENT DOCUMENTS

| | | | | |
|---|---|---|---|---|
| 6,072,185 A * | 6/2000 | Arai | ............ | B82Y 10/00 250/492.2 |
| 6,161,103 A * | 12/2000 | Rauer | ............ | G06Q 30/02 |
| 6,178,121 B1 * | 1/2001 | Maruyama | ............ | G11C 11/4074 365/149 |
| 6,181,609 B1 * | 1/2001 | Muraoka | ............ | G11C 7/1051 365/189.05 |
| 6,189,004 B1 * | 2/2001 | Rassen | ............ | G06F 17/30392 |
| 6,237,122 B1 * | 5/2001 | Maki | ............ | G11C 29/32 714/727 |
| 6,243,348 B1 * | 6/2001 | Goodberlet | ............ | B82Y 10/00 369/101 |
| 6,249,824 B1 * | 6/2001 | Henrichs | ............ | G06F 3/0616 360/99.22 |
| 6,694,321 B1 * | 2/2004 | Berno | ............ | G06F 17/3056 |
| 6,701,345 B1 * | 3/2004 | Carley | ............ | G06F 17/30368 707/999.008 |
| 7,069,179 B2 | 6/2006 | Kim et al. | | |
| 7,941,438 B2 * | 5/2011 | Molina-Moreno et al. | ... | 707/756 |
| 8,445,973 B2 * | 5/2013 | Luo | ............ | H01L 29/66795 257/401 |
| 2005/0138160 A1 * | 6/2005 | Klein | ............ | H04L 41/024 709/223 |
| 2007/0016542 A1 | 1/2007 | Rosauer et al. | | |
| 2008/0016110 A1 * | 1/2008 | Grossman et al. | ............ | 707/103 R |
| 2008/0195649 A1 * | 8/2008 | Lefebvre | ............ | 707/102 |
| 2008/0256575 A1 | 10/2008 | Raju et al. | | |
| 2013/0151491 A1 * | 6/2013 | Gislason | ............ | G06F 17/30339 707/696 |

OTHER PUBLICATIONS

Abadi et al., Column-Stores vs. Row-Stores: How different ar ther really? ACM; 2008.*
C-Store: A Column-oriented DBMS, VLDB conference, 2005.*

* cited by examiner

Primary Examiner — Daniel Kuddus
(74) Attorney, Agent, or Firm — Schmeiser, Olsen & Watts, LLP; David Quinn

(57) ABSTRACT

A method and system for processing a data load. A request is received for a data load to load data into a database in accordance with a data template that includes data to be loaded into the database. The template includes columns and rows. The request specifies a request type characterized by at least one column that collectively includes unique data for each row. The columns include N sets of columns (N≥1) in addition to the at least one column. The data load is split into multiple loads of data. The multiple loads include one load and N additional loads. The one load is associated with the at least one column. The N additional loads are respectively associated with the N sets of columns and are configured to generate or modify one or more rows in each table of N respective additional tables in the database.

18 Claims, 11 Drawing Sheets

PROCESSING DATA LOADS

TECHNICAL FIELD

The present invention relates generally to processing data loads and more specifically to comprehensive and automated processing of data loads.

BACKGROUND

It is common in today's service management applications to require data loads. Examples of data that needs to be loaded include records of new persons, new assets, security groups, etc. Typically, these loads are manually performed, but the manual process leads to a number of problems, some of which are as follows.

With complex data models, some data loads depend on the success of one or more prior data loads, further complicating the responsibility on the data loader to ensure previous loads were successful.

For referential integrity purposes, some data loads depend on data already existing in the data source, driving additional responsibility on the data loader to confirm that the requisite data is already present in the data source before loading.

Currently automated data loaders attempt to address some of the issues encountered with manual data loading, such as automatically performing validation checks and auto-scheduling the loads, etc. However, currently automated data loaders do not provide capabilities that would enable data loads to be performed at a higher level of functionality.

RAJU et al. (U.S. Publication 2008/0256575) disclose a system that includes a data loader and a data slicer. The data loader is configured to receive and process raw program guide data, and to store the processed program guide data in a data store. The processing includes generating a unique program identifier for each program represented in the raw program guide data. The data slicer is configured to generate a program guide data configuration from the processed program guide data. The program guide data configuration includes program guide data organized into a plurality of data structures based on categories of the program guide data.

KIM et al. (U.S. Pat. No. 7,069,179) disclose a data extracting and processing module that extracts necessary data from a database and generates an analysis table. The data extracting and processing module has a process analysis table generating module and an activity analysis table generating module to extract data and generate the analysis table. The preprocessing module searches characteristics of data on the basis of the data extracted by the analysis table, removes unnecessary attributes, divides instances if necessary, and converts a digital variable into a symbolic variable by dividing sections.

CARLEY et al. (U.S. Pat. No. 6,701,345) discloses downloading data from the a user station to a server. It is determined whether another load process is being concurrently executed by another user station. If it is determined that a load process is being concurrently executed, a notification is sent to the user station. A notification is also sent to the user station that initiated the concurrently executing load process. At least one of the load processes is suspended upon detecting the concurrently executed load process. At least one of the load processes may be allowed to continue upon receiving a command to continue from the user station associated with the suspended load process. A data management template corresponding to files/records is selected. The data management template may include a listing of all records/files that should be loaded. Alternatively, the data management template may specify particular content of the files/records that must be matched for verification. As an option, the data management template may specify specific particular sizes of the files/records. It is validated that all of the records/files to be loaded match the data management template. The records/files are sent to a database for loading in the database upon validation that the records match the data management template.

BRIEF SUMMARY

The present invention provides a method for processing a data load.

A request is received for a data load to load data into a database in accordance with a data template that includes the data to be loaded into the database, the template comprising a plurality of columns and a plurality of rows, the request specifying a request type characterized by at least one column of the plurality of columns, the at least one column collectively including unique data for each row of the plurality of rows, the plurality of columns comprising N sets of columns in addition to the at least one column, N being at least 1.

The data load is split into multiple loads of data, the multiple loads comprising one load of data and N additional loads of data, the one load being associated with the at least one column, the N additional loads respectively associated with the N sets of columns, the one load configured to generate or modify one or more rows of one table in the database, the one table comprising a column serving as a primary key in association with the at least one column, the N additional loads configured to generate or modify one or more rows in each table of N respective additional tables in the database, each table of the N additional tables comprising a column serving as a foreign key with respect to the primary key of the one table.

DETAILED DESCRIPTION

Figure 1:
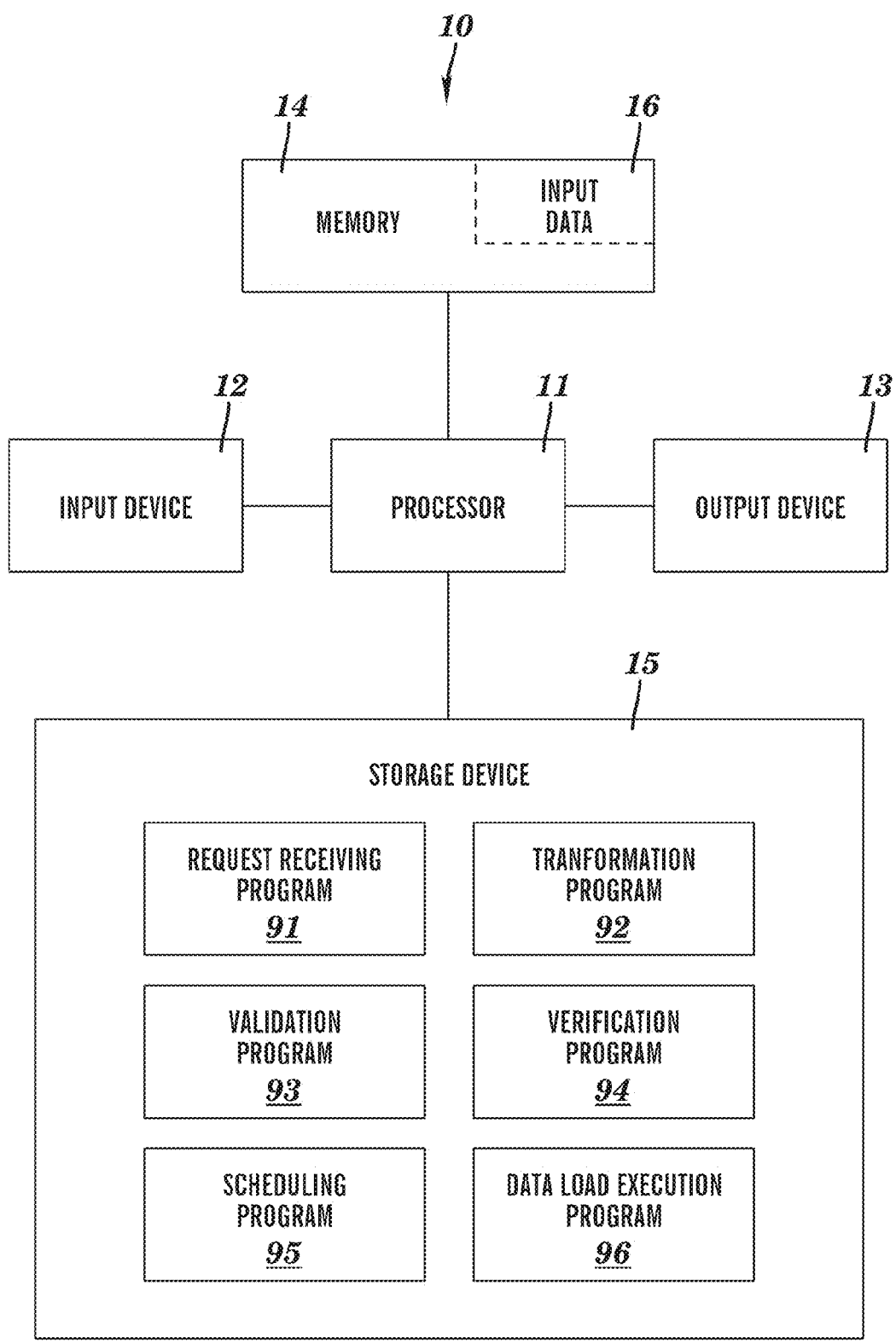
FIG. 1 illustrates a computer system for processing a data load, in accordance with embodiments of the present invention.

FIG. 1 illustrates a computer system 10 for processing a data load, in accordance with embodiments of the present invention. The computer system 10 comprises a processor 11, an input device 12 coupled to the processor 11, an output device 13 coupled to the processor 11, a memory 14 coupled to the processor 11, and a storage device 15 each coupled to the processor 11. The input device 12 may be, inter alia, a keyboard, a mouse, etc. The output device 13 may be, inter alia, a printer, a plotter, a computer screen, a magnetic tape, a removable hard disk, a floppy disk, etc. The memory 14 may be, inter alia, random access memory (RAM). The storage device 15 may be, inter alia, a hard disk, a floppy disk, a magnetic tape, an optical storage such as a compact disc (CD) or a digital video disc (DVD), etc. The storage device 15 comprises program code configured to be executed by the processor 11 via the memory 14 to perform a method for processing a data load.

The program code comprises software programs, each software program including program instructions. The software programs include a request receiving program 91, a transformation program 92, a validation program 93, a verification program 94, a scheduling program 95, and a data load execution program 96. The request receiving program 91 receives a request to execute a data load to perform an action on a database in accordance with a template. The transformation program 92 performs transformations on the data load, including splitting the data load into multiple loads of data and storing the multiple loads in respective multiple files. The validation program 93 validates conformity of the data load to validation rules in validation rules files. The verification program 94 resolves any dependencies within the data load and/or dependencies with respect to pending data loads. The scheduling program 95 schedules execution of the data load. The data load execution program 96 executes the multiple loads of data in accordance with the scheduling to perform the action on the database.

The processor 11 executes the programs 91-96. The memory 14 may store input data 16. The input data 16 includes input data required by the programs 91-95. The output device 13 displays output from the programs 91-96. The storage device 15 may represent a tangible computer readable storage device (such as a magnetic disk or semiconductor memory), or alternatively a plurality of tangible computer readable storage devices, storing the programs 91-96 for execution by the processor 11, or alternatively by one or more processors (e.g., a plurality of processors), via the memory 14. Generally, the programs 91-96 may be stored on a single storage device or may be stored by being distributed among a plurality of storage devices in any manner known in the art. A computer program product (or, alternatively, an article of manufacture) of the computer system 10 may comprise the storage device 15, or a plurality of storage devices, storing the programs 91-96 for execution by the processor 11, or alternatively by a plurality of processors, via the memory 14. The term "computer readable storage device" does not include a signal propagation medium.

While FIG. 1 shows the computer system 10 as a particular configuration of hardware and software, any configuration of hardware and software, as would be known to a person of ordinary skill in the art, may be utilized for the purposes stated supra in conjunction with the particular computer system 10 of FIG. 1. For example, the storage device 15 may represent one or more tangible computer readable storage devices for execution by the processor 11, or alternatively by a plurality of processors, via the memory 14.

Figure 2:
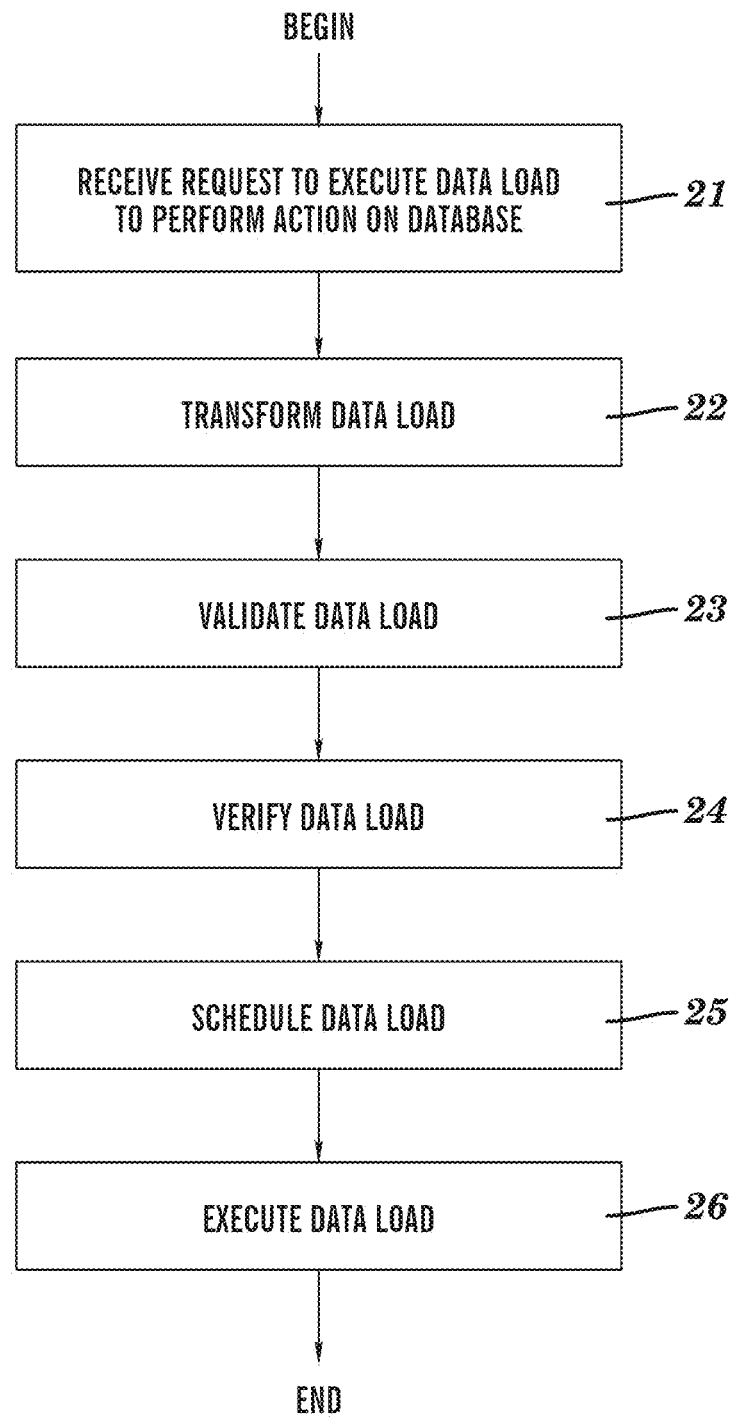
FIG. 2 is a flow chart depicting a method, using programs stored in the computer system of FIG. 1, for processing a data load, in accordance with embodiments of the present invention.

FIG. 2 is a flow chart depicting a method for processing a data load, in accordance with embodiments of the present invention. The flow chart of FIG. 2 includes steps 21-26.

In step 21, the request receiving program 91 receives a request to load data into a database in accordance with a data template that includes data to be loaded into the database.

The request may be received from, inter alia, a data load requestor such as a user, an administrator (e.g., a database administrator), and a computer program that constructs the request.

A data load in the context of the present invention is a procedure in which an action on a database is performed in accordance with a data template that includes data to be loaded into the database to enable the action to be performed.

The data template includes the data to be loaded into the database to enable the action to be performed. The data template comprises a tabular format comprising a plurality of columns and a plurality of rows. The data to be loaded into the database appears in the plurality of columns and the plurality of rows. Examples of data templates include a spreadsheet (e.g., an Excel spreadsheet), a table of a database, etc.

The database resides in a computer system (e.g., the computer system depicted in FIG. 1) and may be a relational database having a plurality of tables. The database may be communicated with using any known database communication language such as, inter alia, Structured Query Language (SQL).

If the data template is a table of a database, then the database comprising the data template may be the same database, or a different database, as the database into which the action is to be performed in conjunction with the data to be loaded.

The request includes specification of a request type and an action type.

The request type is characterized by at least one column of the plurality of columns of the data template. The at least one column of the template, which characterizes the request type, collectively includes unique data for each row of the plurality of rows. The plurality of columns comprises N sets of columns in addition to the at least one column, wherein N is at least 1. In various embodiments, N may be 1, 2, 3, or any positive integer of at least 2 or exceeding 2. The N sets of columns are used in conjunction with splitting the data load into multiple loads of data as discussed infra in conjunction with steps 38-39 in FIG. 3. In one embodiment, the plurality of columns comprises other columns in addition to the at least one column and the N sets of columns. In one embodiment, the data template comprises other columns in addition to the plurality of columns. In one embodiment, the data template comprises other rows in addition to the plurality of rows.

The action to be performed on the database may include the action types of: Add, Change, and AddChange. An Add action type pertains to an insert into the database of at least one new record that does not currently exist in the database. A Change action type pertains to a change (i.e., modification) of at least one existing record in the database. An Add/Change action type:(implements Add for records pertaining to the data load that do not currently exist in the database; and implements Change for records pertaining to the data load that currently exist in the database.

In step 22, the transformation program 92 performs a data load transformation process, which will be discussed infra in more detail in conjunction with FIG. 3.

In step 23, the validation program 93 performs a data load validation process, which will be discussed infra in more detail in conjunction with FIG. 4.

In step 24, the verification program 94 performs data load verification process, which will be discussed infra in more detail in conjunction with FIGS. 5A, 5B, 5C, and 5D.

The rule files for transformation, validation, and verification used in steps 22-24 may be XML-based, python scripts, etc.

If any of the three phases of steps 22-24 (transformation, validation, verification) fail, then the data load is cancelled and an email may be sent to the data load requester. The email may comprise a list of the errors found (e.g., up to 100), which line numbers in the template the errors were found, and which attributes (i.e., columns) in the template the error relates to.

If all of the three phases of steps 22-24 (transformation, validation, verification) do not fail and were successfully performed, then in one embodiment approvals may be required before the next step of implementing the scheduling step 25 is enabled if there are manually added approvers and/or system-driven approvers which were added to the request. System-driven approvers may be configured by priority, such that for a priority 1 request (run now), users A, B and C would be required to approve; for a priority 2 request (daily load), user Z would be required, etc. Alternatively, no system-driven approvers are configured. Note that the system-driven approvals are not limited to being driven by the priority of the request and other configuration options pertaining to approvals are possible as well. Approval notices may be sent to each of the approvers and the system of the present invention may wait for approval acceptance/rejection by users. When the approvals are successfully processed, or if there were no approvals, execution of the data load pertaining to the request is scheduled in step 25.

In step 25, the scheduling program 95 schedules the data load, which will be discussed infra in more detail in conjunction with FIG. 6.

In step 26, the data load execution program 96 executes the data load, which will be discussed infra in more detail in conjunction with FIG. 7.

Figure 3:
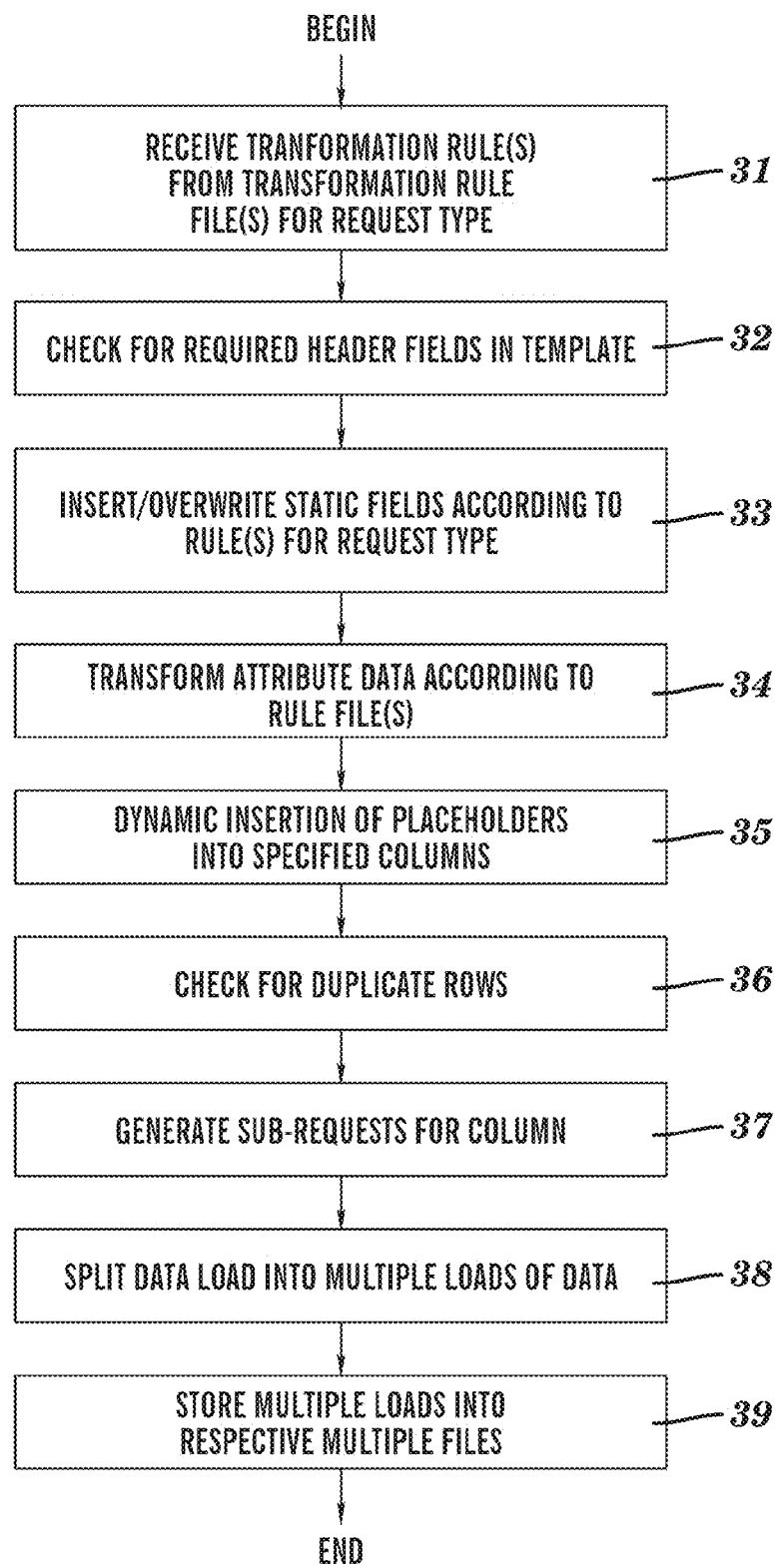
FIG. 3 is a flow chart of a transformation program stored in the computer system of FIG. 1, in accordance with embodiments of the present invention.

FIG. 3 is a flow chart the transformation program 92 stored in the computer system of FIG. 1, in accordance with embodiments of the present invention. The flow chart of FIG. 3 includes steps 31-39 which are performed by the transformation program 92.

In step 31, the transformation program 92 retrieves transformation rule(s) for the request type of the request, from transformation rule files(s) stored in data storage within the computer system 10 of FIG. 1, pertaining to the request received in step 21. The stored transformation rules are keyed to request type. Steps 32-39 are implemented in accordance with the transformation rule(s) retrieved in step 31.

In one embodiment, in step 32 the transformation program 92 checks for required header fields in the data template.

In one embodiment, in step 33 the transformation program 92 inserts and/or overwrites static fields according to rules for the request type specified in the received request. Static fields may be added into the underlying load for values that are constant for all loads or can be determined/calculated in an automated manner per load and do not need to be in the template.

In one embodiment, in step 34 the transformation program 92 transforms attribute data according to rules in rule files.

In one embodiment, in step 35 the transformation program 92 dynamically inserts placeholders for specified columns of the template concerning data that needs to be generated right before the data loading of step 26 of FIG. 1. For example, an identifier may be required to be generated for the data load execution that is not scheduled to be executed until next week. In this example, an identifier for a specified column cannot be generated currently, because another user might have manually created the same identifier in the user interface before the data load execution is started, which would lead to a duplicate key error. As a remedy, step 35 inserts a placeholder into the pertinent additional file 87 . . . 88 (see step 39 and FIG. 8 discussed infra), and when the scheduled execution of the data load approaches, the required identifier is generated just before data load execution and placed in the specified column of the pertinent additional file 87 . . . 88.

In one embodiment, in step 36 the transformation program 92 checks for duplicate rows, which are rows in the data template that already exist in the database. Thus, the duplicate row in the data template is ignored and the user or data load requestor may be emailed when this situation is encountered to inform the user or data load requestor of the duplicate row. For example if the action type is Add and there exists a row in the data load with a primary key already existing in the database, then the transformation would skip that row from the data load and email the user or data load requestor concerning the removed record.

In one embodiment, in step 37 the transformation program 92 tokenizes the comma-separated data values in a column of the template, which creates a sub-request for each such data value and associates the sub-requests with a same identifier. For example with CLASSIFICATION and CUSTOMER fields in the data template, a classification can be associated with multiple customers, so the original data load request can contain a CUSTOMER field in which the requester can put a comma-separated list of customers. Each of those customers would be generated in a separate row for the sub-request that associates the customer to the classification.

Figure 8:
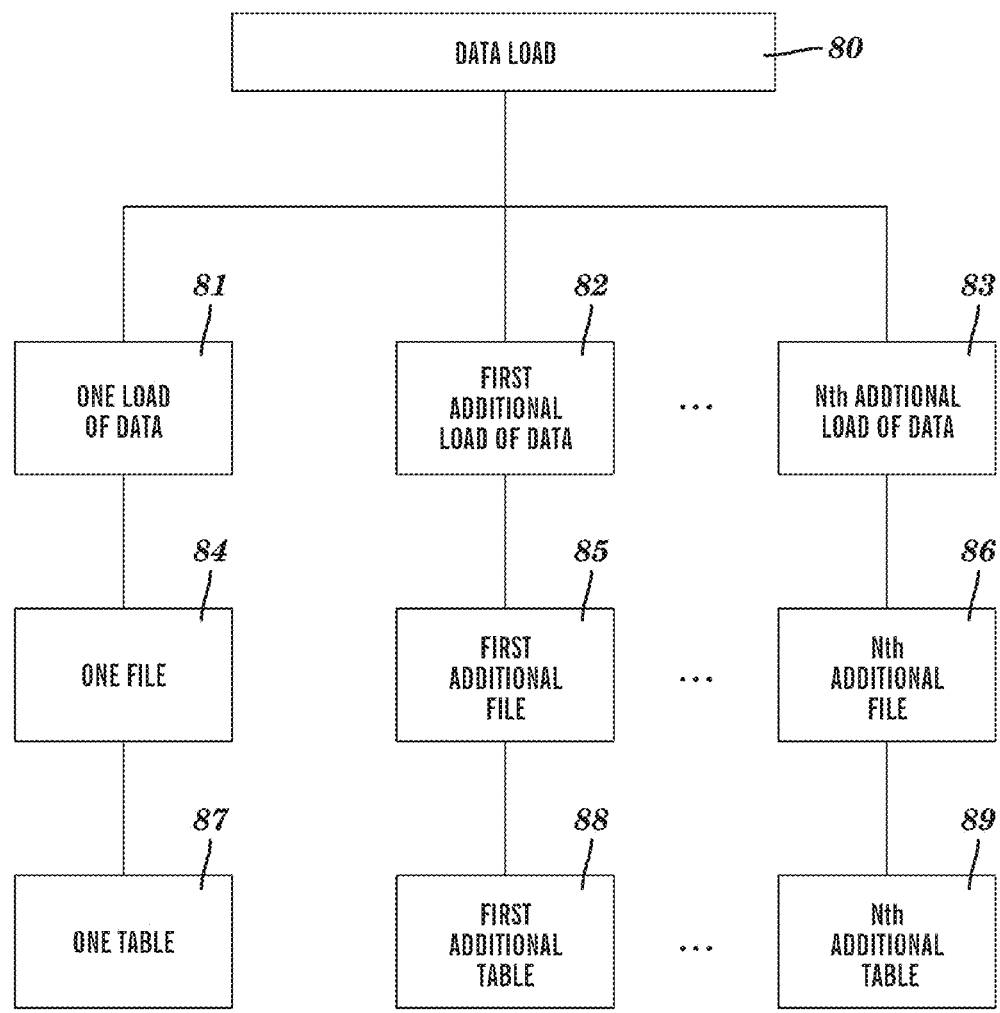
FIG. 8 schematically illustrates a splitting of the data load into multiple loads of data, in accordance with embodiments of the present invention.

In one embodiment, in step 38 the transformation program 92 splits the data load into multiple loads of data, as illustrated schematically in FIG. 8. FIG. 8 schematically illustrates a splitting of the data load into multiple loads of data, in accordance with embodiments of the present invention.

In FIG. 8, the data load 80 is split into multiple loads of data comprising one load of data 81 and N additional loads of data 82, . . . , 83. The one load of data 81 is associated with the at least one column of the data template. The N additional loads of data 82 . . . 83 are respectively associated with the N sets of columns of the data template. The one load of data 81 is configured to generate or modify one or more rows of one table in the database. The one table in the database comprises a column serving as a primary key in association with the at least one column of the data temple. The N additional loads of data are configured to generate or modify one or more rows in each table of N respective additional tables in the database. Each table of the N additional tables in the database comprises a column serving as a foreign key with respect to the primary key of the one table in the database.

In one embodiment, (i) in each row of the plurality of rows, each column of no less than one column in each set of columns of the N sets of columns is independently linked to the at least one column by a data link contained in cells located at an intersection of each row of the plurality of rows with each column of the no less than one column in each set of columns of the N sets of columns, and (ii) the one or more rows of each additional table in the database respectively correspond to the cells containing the data link in the no less than one column in the respective set of columns of the N sets of columns.

In one embodiment, in step 39 in FIG. 3 the transformation program 92 stores the multiple loads of data in respective multiple files configured to be subsequently executed to perform the action on the database. In FIG. 8, the multiple files comprise one file 84 corresponding to the one table 87 and N additional files 85, . . . , 86 respectively corresponding to the N additional tables 88, . . . , 89. The one file 84 and each additional file (85 . . . 86) comprise records and fields. The fields of the one file 84 correspond to respective columns of the one table in the database. The records of the one file 84 correspond to respective rows of the one table 87 in the database. The fields of each additional file (85 . . . 86) correspond to respective columns of the respective additional tables 88, . . . , 89 in the database. The records of each additional file (85 . . . 86) correspond to respective rows of the respective additional table (88 . . . 89) in the database. Step 39, stores the multiple files (84, 85, . . . , 86) in data storage within the computer system 10 of FIG. 1.

The one-to-one mappings in FIG. 8, between loads of data and files and between files and tables, are exemplary and any other mappings that track each additional load of the 1+N additional loads of data are within the scope of the present invention. For example, the 1+N files in FIG. 8 could be replaced by one or two files, suitably organized to keep track of the 1+N additional loads of data.

Figure 4:
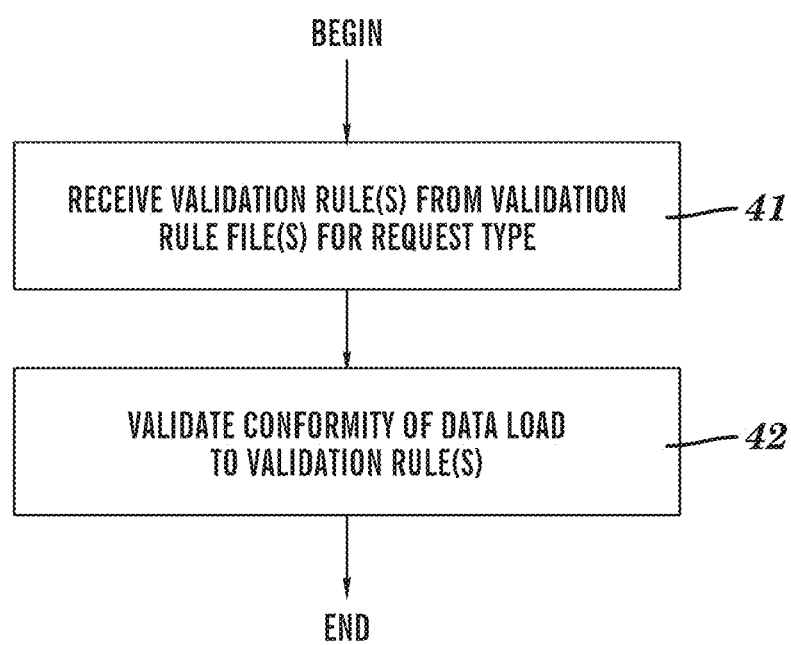
FIG. 4 is a flow chart of a validation program stored in the computer system of FIG. 1, in accordance with embodiments of the present invention.

FIG. 4 is a flow chart of steps in the validation program 93 stored in the computer system of FIG. 1, in accordance with embodiments of the present invention. The flow chart of FIG. 4 includes steps 41-42 which are performed by the validation program 93.

In step 41, the validation program 93 retrieves validation rule(s) for the request type of the request, from validation rule files(s) stored in data storage within the computer system 10 of FIG. 1, pertaining to the request received in step 21. The stored validation rules are keyed to request type. Step 42 is implemented in accordance with the validation rule(s) retrieved in step 41.

In step 42, the validation program 93 validates conformity of the data load to the validation rule(s). Step 42 checks whether field lengths in the data temple are correct, checks that non-nullable fields in the data template have values in the non-nullable fields, checks data type of values in the data template, etc.

The data load verification process of step 24 in FIG. 2 ensures referential integrity of the values in the data template. For example, if a user is attempting to associate a time zone to a person in a data load, then the time zone must exist in the database prior to loading. In addition, the data load verification process of step 24 ensures satisfaction of dependencies of the values in the data template. For example, in person in a column of a data template could have a supervisor, as reflected in another column of the template. The supervisor would need to exist in the database, or internally within the template, or in a pending load before the data load could proceed as described in the flow charts if FIGS. 5A, 5B, 5C, and 5D.

Figure 5A:
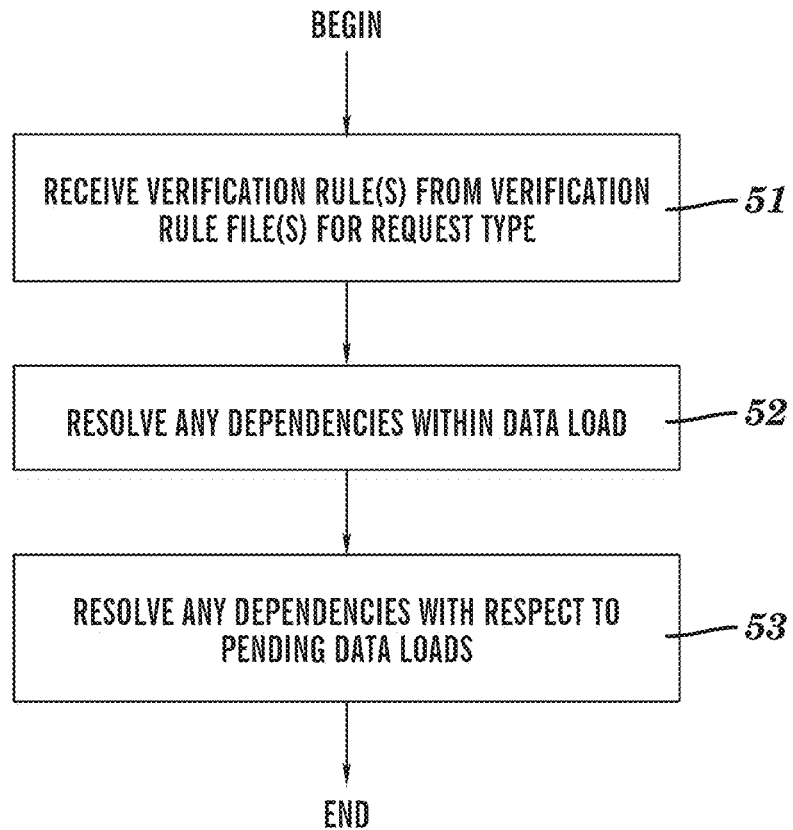
FIG. 5A is a flow chart of steps in a verification program that stored in the computer system of FIG. 1 and used for resolving dependencies with respect to the data load, in accordance with embodiments of the present invention.

FIG. 5A is a flow chart of steps in the verification program 94 stored in the computer system of FIG. 1 and used for resolving dependencies with respect to the data load, in accordance with embodiments of the present invention. The flow chart of FIG. 5A includes steps 51-53 which are performed by the verification program 94.

In step 51, the verification program 94 retrieves verification rule(s) for the request type of the request, from verification rule files(s) stored in data storage within the computer system 10 of FIG. 1, pertaining to the request received in step 21. The stored verification rules are keyed to request type. Steps 52-53 are implemented in accordance with the verification rule(s) retrieved in step 51.

Figure 5B:
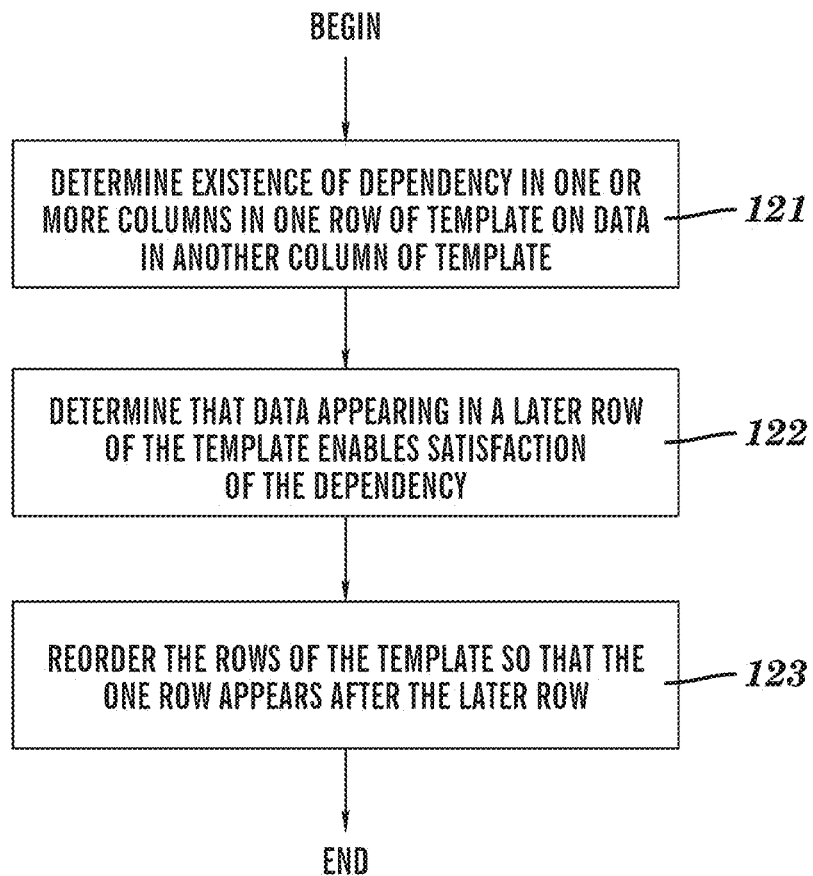
FIG. 5B is a flow chart of steps in the verification program for resolving a dependency internally within the data load, in accordance with embodiments of the present invention.

In step 52, the verification program 94 resolves discrepancies within the data load, as described infra in conjunction with FIG. 5B.

Figure 5C:
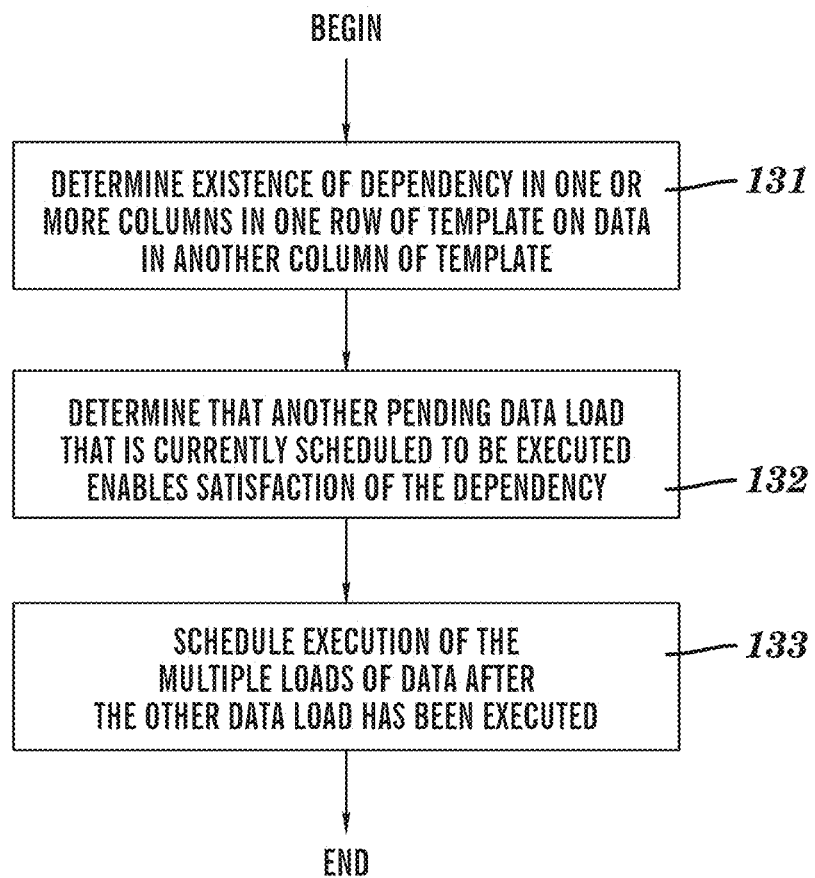
FIG. 5C is a flow chart of steps in the verification program for resolving a dependency with respect to another pending data load, in accordance with embodiments of the present invention.

In step 53, the verification program 94 resolves discrepancies with respect to pending data loads, as described infra in conjunction with FIG. 5C.

FIG. 5B is a flow chart of steps in the verification program 94 for resolving a dependency internally within the data load, in accordance with embodiments of the present invention. The flow chart of FIG. 5B includes steps 121-123 which are performed by the verification program 94.

In step 121, the verification program 94 determines that data in one or more columns in one row of the template are dependent upon data pertaining to another column of the template and that the data pertaining to the other column does not exist in the database. The data pertaining to the other column is data of the other column that is required to be in the database when execution of the data load performs a loading of the one or more columns into the database. In one embodiment, the data in the one or more columns comprises the unique data of the at least one column. In one embodiment, the data in the one or more columns do not comprise the unique data of the at least one column, and comprises any other one or more columns of the template generally or of the plurality of columns in particular, exclusive of the other column. In one embodiment, the other column is comprised by the N sets of columns. In one embodiment, the other column is not comprised by the N sets of columns and is comprised by any other column of the template generally or of the plurality of columns in particular, exclusive of the one or more columns.

In step 122, the verification program 94 determines that another row of the template comprises the data pertaining to the other column and appears after the one row in the template.

In step 123, the verification program 94 in response to the determining that the other row comprises the data pertaining to the other column and appears after the one row in the template, reorders the rows of the template which results in the one row appearing after the other row in the template.

FIG. 5C is a flow chart of steps in the verification program 94 for resolving a dependency with respect to a pending data load, in accordance with embodiments of the present invention. The flow chart of FIG. 5C includes steps 131-133 which are performed by the verification program 94.

In step 131, the verification program 94 determines that data in one or more columns in one row of the template are dependent upon data pertaining to another column of the template and that the data pertaining to the other column does not exist in the database. The data pertaining to the other column is data of the other column that is required to be in the database when execution of the data load performs a loading of the one or more columns into the database. In one embodiment, the data in the one or more columns comprises the unique data of the at least one column. In one embodiment, the data in the one or more columns do not comprise the unique data of the at least one column, and comprises any other one or more columns of the template generally or of the plurality of columns in particular, exclusive of the other column. In one embodiment, the other column is comprised by the N sets of columns. In one embodiment, the other column is not comprised by the N sets of columns and is comprised by any other column of the template generally or of the plurality of columns in particular, exclusive of the one or more columns.

In one embodiment, it is determined that a field defined by an intersection of one of the columns (of the plurality of columns) and one of the rows (of the plurality of rows) is dependent upon data in a different column in the data template, and that the data in the different column does not currently exist in the database.

In step 132, the verification program 94 determines that another data load is currently scheduled to be executed to load the data pertaining to the other column into the template.

In step 133, the verification program 94 in response to the determining that the other data load is currently scheduled to be executed to load the data pertaining to the other column into the template, schedules execution of the multiple loads to occur after the other data load has been executed.

Figure 5D:
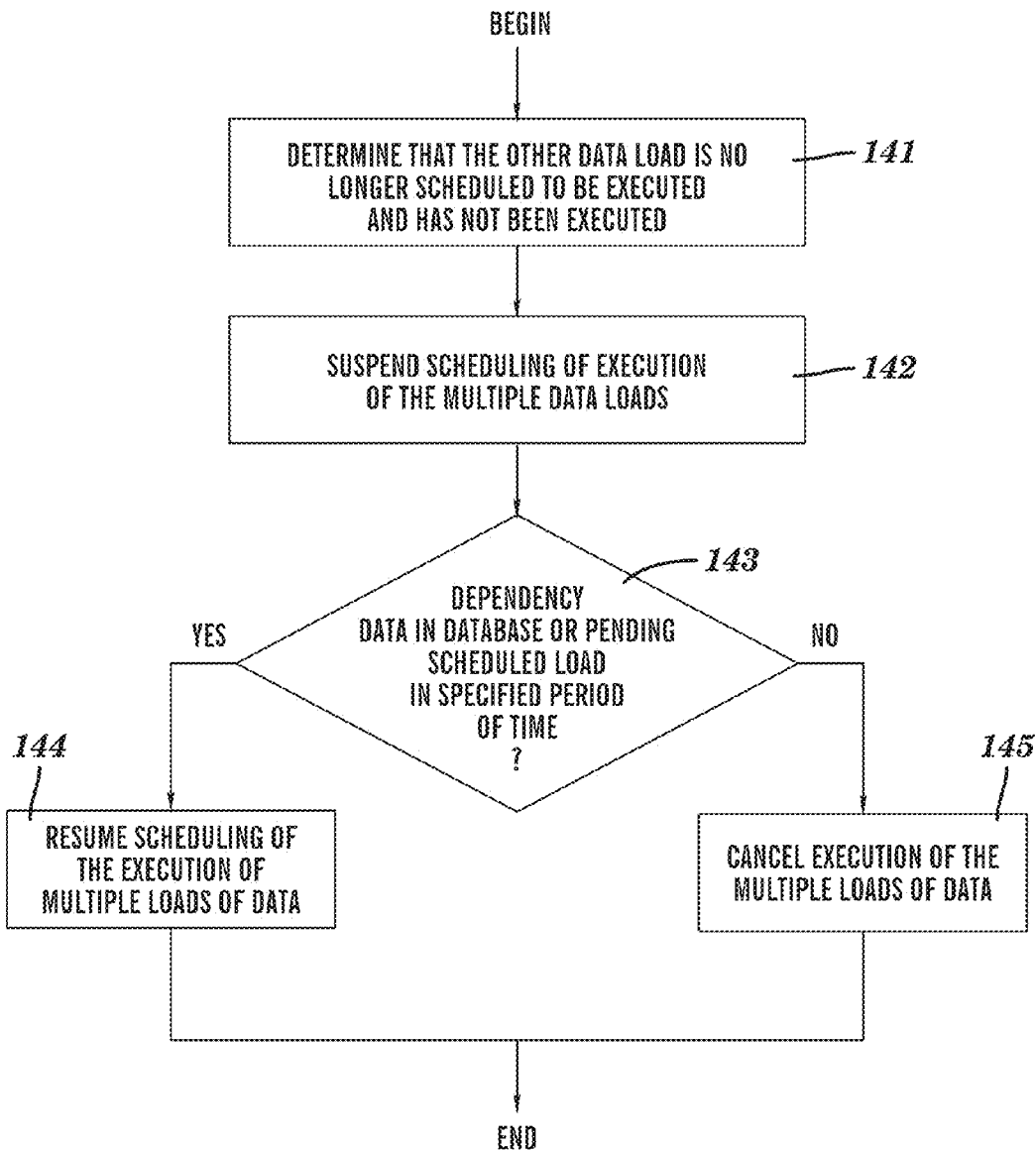
FIG. 5D is a flow chart of steps in the verification program for responding to the other data load of FIG. 5C no longer scheduled to be executed and not having been executed, in accordance with embodiments of the present invention.

FIG. 5D is a flow chart of steps in the verification program 94 for responding to the other data load of FIG. 5C no longer scheduled to be executed and not having been executed, in accordance with embodiments of the present invention. The flow chart of FIG. 5D is performed after step 133 of FIG. 5C has been performed and includes steps 141-145 which are performed by the verification program 94.

In step 141, the verification program 94 determines that the other data load is no longer scheduled to be executed and has not been executed.

In step 142, the verification program 94 in response to having determined that the other data load is no longer scheduled to be executed and has not been executed, suspends the scheduling of execution of the multiple loads.

In step 143, the verification program 94 ascertains whether the data pertaining to the other column has been added to the database within a specified period of time after the determining that the other data load is no longer scheduled to be executed and has not been executed, and that there is no other data load currently scheduled to be executed and configured to load the data pertaining to the other column into the template.

In step 144, the verification program 94 in response to step 143 having ascertained that the data pertaining to the other column has been added to the database within the specified period of time, or that there is a pending data load currently scheduled to be executed and configured to load the data pertaining to the other column into the template, restores the scheduling of execution of the multiple loads.

In step 145, the verification program 94 in response to step 143 having ascertained that the data pertaining to the other column has not been added to the database within the specified period of time, and that there is no other data load currently scheduled to be executed and configured to load the data pertaining to the other column into the template, cancels the execution of the multiple loads.

Figure 6:
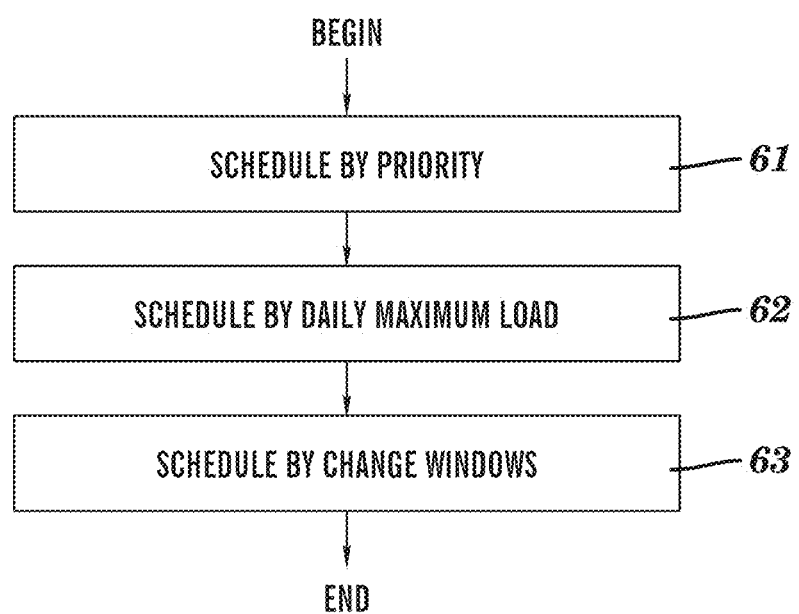
FIG. 6 is a flow chart of a scheduling program stored in the computer system of FIG. 1, in accordance with embodiments of the present invention.

FIG. 6 is a flow chart of the scheduling program 95 stored in the computer system of FIG. 1, in accordance with embodiments of the present invention. The flow chart of FIG. 6 includes steps 61-63 which are performed by the scheduling program 95. Each step of steps 61-63 is an independent method of scheduling execution of the data load. The methods of steps 61-63 may be used as alternative methods, or may be used in any combination.

In step 61, the scheduling program 95 schedules the execution of the data load by priority. For example, a priority 1 data load is executed now, a priority 2 data load is executed daily, a priority 3 data load is executed bi-daily (Monday, Wednesday, Friday, etc.), and a priority 4 data load is executed weekly (Saturday nights). There are overwrite capabilities; e.g., a priority 3 load request can be overwritten to run now if the number of records is below a certain threshold (e.g., 15) since a low threshold would not adversely affect system performance extensively, so that the data load can occur during business hours.

In step 62, the scheduling program 95 schedules the execution of the data load by daily maximum load. Although a data load may be scheduled to be executed now, if the daily maximum load limit has been exceeded, the data load may be scheduled to be executed the following day. The daily maximum load scheduling process takes the records in split loads into account as well.

In step 63, the scheduling program 95 schedules the execution of the data load by change windows. A change window is a set period of time during which the system is taken down for maintenance and is unavailable to users. Large files (e.g., 100,000 records) can be scheduled during change windows so as not to adversely impact user performance during normal system usage. The scheduling within change windows can use estimation techniques so that execution of the data load would be scheduled with enough time to complete before the change window is finished, based on an approximation of how long each record takes to load and the number of records. For example, the inventors of the present invention determined, for a bulk load of 20,000 records with full debug logging on, that each record took on average 150 milliseconds to load, so that the system can use this baseline threshold in estimations of future loads for this same request type (timings of loads for another request type might exhibit different characteristics, depending for example, on the complexity of the data model, how much data the tables for the other request type contain, etc.). Thus, since change windows are scheduled and the period of time of different change windows may be different, execution of different data loads may be performed in different change windows to minimize the adverse impact of execution of the data loads on system performance.

Figure 7:
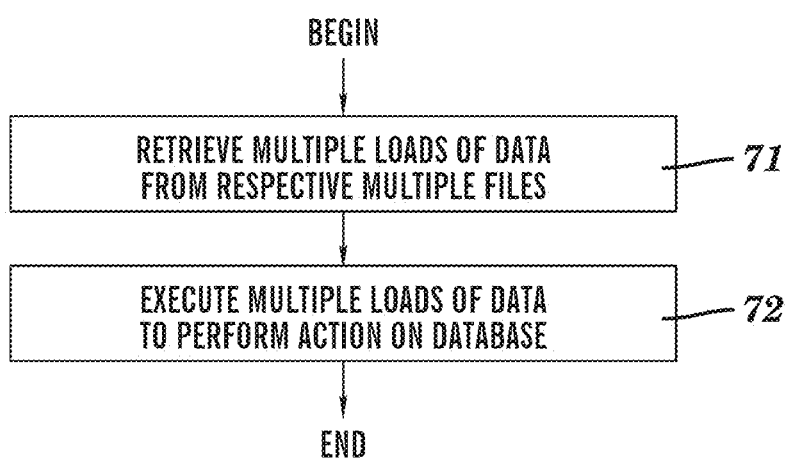
FIG. 7 is a flow chart of a data load execution program stored in the computer system of FIG. 1, in accordance with embodiments of the present invention.

FIG. 7 is a flow chart of the data load execution program 96 stored in the computer system of FIG. 1, in accordance with embodiments of the present invention. The flow chart of FIG. 7 includes steps 71-72 which are performed by the data load execution program 96.

In step 71, the data load execution program 96 retrieves multiple loads of data from respective multiple files. The multiple loads of data had been stored in the respective multiple files in step 39 of FIG. 3.

In step 72, the data load execution program 96 executes the retrieved multiple loads of data to perform the action on the database. In one embodiment, the data load is automatically loaded into the system. In one embodiment, the data load template is an Excel spreadsheet, and for each row in the Excel spreadsheet, a SOAP XML message is sent to a web service to process the load. The return code for each web service call may be checked, and if there were any errors, the line number, error message, and date of the error may be attached to the request in the graphical user interface (GUI) so the data load requester can view it. A low probability of error is expected during the data loading because of the error checking performed during the preprocessing steps of transformation, validation, and verification.

The system keeps track of primary keys for errors such that if a row for the first load in a split load fails, the corresponding row in the second (and nth) load in the split loads are skipped.

The system keeps tracks of which rows have been loaded, and also serializes the preprocessed data structure into a file in case the system is restarted. Then on restart, the system first processes any unfinished loads before continuing onto new loads.

In a post-verification after execution of the data loading, for each row in the data template, SQL "select" queries on the database may be issued to ensure that the data of the data load is actually in the database. The "where" clause of the "select" query may be dynamically generated based on the data in each row, and the SQL "select" query may be of the form: select 1 from <object> where attribute1=value1 and attribute2=value2 and attribute3=value3, etc. In one embodiment, environment owners may define custom SQL for non-standard post-verification. If the record selected by the "select" query is returned for post-verification, then it is inferred that the data was loaded successfully, and if the record is not returned then it is inferred that the data was not loaded successfully.

The following example illustrates the splitting of the data load into multiple loads of data. Table 1 is a data template for this example and Tables 2A, 2B, and 2C depict an underlying structure of CLASSIFICATION, CLASS2CUSTOMER, and CLASS2APP database tables respectively associated with classification, customer, and application.

TABLE 1

Data Template.

| Row Number | Description | Customer-ABC | Customer-XYZ | App-SR | App-INC | Parent (row number) |
|---|---|---|---|---|---|---|
| 1 | Virus | 1 | | 1 | 1 | |
| 2 | Virus/Email | 1 | | 1 | 1 | 1 |
| 3 | Hardware | | 1 | | 1 | |
| 4 | General Issue | 1 | 1 | 1 | 1 | |

TABLE 2A

CLASSIFICATION

| CLASSIFICATIONID_PK | DESCRIPTION | PARENT | CREATED BY |
|---|---|---|---|

TABLE 2B

CLASS2CUSTOMER

| CLASS2CUSTOMERID_PK | CLASSIFICATIONID_FK | CUSTOMER |
|---|---|---|

TABLE 2C

CLASS2APP

| CLASS2APPID_PK | CLASSIFICATIONID_FK | APP |
|---|---|---|

In the data template of Table 1, the Description column describes the classification and is the at least one column pertaining to the request type of CLASSIFICATION. There are two sets of columns (i.e., N=2). The first set of columns includes the two customer columns of Customer-ABC and Customer-XYZ. The second set of columns includes the two application columns of APP-SR and APP-INC. The value of "1" appearing in various cells in each row in each set of columns is a data link that independently links rows of the two customer columns (Customer-ABC and Customer-XYZ) and the two application columns (APP-SR and APP-INC) with corresponding rows of the at least one column (Description) in the data template.

The top row of the data template of Table 1 is a header row whose cells are header fields of "Row Number", "Description", "Customer-ABC", "Customer-XYZ", "App-SR", "App-INC", "Parent", and other header fields associated with columns of the template not explicitly shown in Table 1.

In this example, the request specifies a request type of CLASSIFICATION which is characterized by the "Description" column in the template of FIG. 1. The request also specifies an action type of AddChange. Other request types may include PERSON, USER, ASSET, etc., each of which would be characterized by a set of columns in the template of Table 1.

The transformation rules for the request type of CLASSIFICATION, and the action types, are listed in Table 3.

TABLE 3

Transformation Rules

1. Ensure all header fields are present in template (as per the definition of the data template). If all are not present, generate an error and exit.
2. If Action Type = 'Add' then
    1. If data already exists in DB, generate an error and exit.
    2. Create internal file for Classification load by processing each row from data template:
        1. Generate value for CLASSIFICATIONID_PK. Example format for generation is using customer as prefix (or global if applicable to multiple customers) and concatenating next sequence number from database to the end of it.
        2. Check if the classification is used as a parent in any subsequent rows in the data template, and if so, set PARENT value to be generated identifier, otherwise leave PARENT blank
            3. Set DESCRIPTION = description from data template
        4. Set CREATEDBY = a static value identifying the system userid for loading (ex. 'LOADERUSERID')
    3. Create internal file for Class2Customer load:
        1. Do not generate value for CLASS2CUSTOMERID_PK - let the database autogenerate and populate it.
        2. Set CLASSIFICATIONID_FK = generated classification identifier from Classification load.
        3. Set CUSTOMER = customer from data template where value = 1 (add additional rows for each customer column that has a 1 in it)
    4. Create internal file for Class2App load:
        1. Do not generate value for CLASS2APPID_PK - let the database auto-generate and populate it.
        2. Set CLASSIFICATIONID_FK = generated classification identifier from Classification load.

TABLE 3-continued

Transformation Rules

3. Set APP = app from data template where value = 1 (add additional rows
       for each app column that has a 1 in it)
   5. Enforce ordering of loading internal files, such that Classification is loaded first, then
Class2Customer, then Class2App.
3. If Action Type = 'Change'
   1. If data does not already exist in DB, generate an error.
   2. Essentially follow same logic as 'Add' action type case, except that instead of inserting
   new records into the database, the records that already exist would be updated.
4. If Action Type = 'AddChange'
   1. Essentially follow same logic as 'Add' action type case, except that if the records do
   not already exist, insert new records into the database, otherwise update the records that
   already exist.

In accordance with the transformation rules of Table 3, the data load of Table 1 is split into the database tables of CLASSIFICATION, CLASS2CUSTOMER, and CLASS2APP in Tables 4, 5, and 6 respectively.

TABLE 4

CLASSIFICATION Database Table.

| CLASSIFICATIONID_PK | DESCRIPTION | PARENT | CREATEDBY |
|---|---|---|---|
| ABC001 | Virus | | LOADERUSEID |
| ABC002 | Virus/Email | ABC001 | LOADERUSEID |
| XYZ001 | Hardware | | LOADERUSEID |
| GLOBAL001 | General Issue | | LOADERUSEID |

TABLE 5

CLASS2CUSTOMER Database Table.

| CLASS2CUSTOMERID_PK | CLASSIFICATIONID_FK | CUSTOMER |
|---|---|---|
| 1 | ABC001 | ABC |
| 2 | ABC002 | ABC |
| 3 | XYZ001 | XYZ |
| 4 | GLOBAL001 | ABC |
| 5 | GLOBAL001 | XYZ |

TABLE 6

CLASS2APP Database Table

| CLASS2APPID_PK | CLASSIFICATIONID_FK | APP |
|---|---|---|
| 1 | ABC001 | SR |
| 2 | ABC001 | INC |
| 3 | ABC002 | SR |
| 4 | ABC002 | INC |
| 5 | XY001 | INC |
| 6 | GLOBAL001 | SR |
| 7 | GLOBAL001 | INC |

The CLASSIFICATION database table in Table 4 is the one table in the database whose column CLASSIFICATIONID_PK is a primary key. The two additional database tables of CLASS2CUSTOMER and CLASS2APP each have a CLASSIFICATIONID_FK column serving as a foreign key with respect to the primary key column of CLASSIFICATIONID_PK in the CLASSIFICATION database table. The CLASS2CUSTOMER and CLASS2APP tables have the primary keys of CLASS2CUSTOMERID_PK and CLASS2APPID_PK, respectively, which have no dependent foreign keys in other tables.

The rows of each additional database table (CLASS2CUSTOMER and CLASS2APP) in the database respectively correspond to the cells containing the data link of "1" in the two customer columns (Customer-ABC and Customer-XYZ) and the two application columns (APP-SR and APP-INC) in the data template.

The primary keys of the CLASSIFICATIONID_PK field are generated from the following transformation rule in Table 3: "Generate value for CLASSIFICATIONID_PK. Example format for generation is using customer as prefix (or global if applicable to multiple customers) and concatenating next sequence number from database to the end of it." The preceding rule is also an example of a rule that implements step 34 of FIG. 3 by transforming attribute data according to rules in a rule file in order to generate ABC001, GLOBAL001, etc.

The CREATEDBY column of the CLASSIFICATION database table is an example of a static field having the static value of LOADERUSERID, as discussed supra in conjunction with step 33 of FIG. 3.

In this example, the Parent column in the template of Table 1 identifies hierarchical relationships between different rows, which is transformed to the PARENT column in the CLASSIFICATION database table in accordance with the following rule in Table 3: "Check if the classification is used as a parent in any subsequent rows in the data template, and if so, set PARENT value to be generated identifier, otherwise leave PARENT blank".

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing a data load, the method comprising:

one or more processors receiving a request for a data load to load data into a database in accordance with a template that includes information to be loaded from the template into the database, wherein the data to be loaded into the database comprises the information to be loaded from the template into the database, the template comprising a plurality of columns and a plurality of rows, the request specifying a request type that is characterized by at least one column of the plurality of columns, the at least one column collectively including unique data for each row of the plurality of rows, the plurality of columns comprising N sets of columns in addition to the at least one column, N being a positive integer of at least 1; and the one or more processors splitting the requested data load into multiple loads of data, the multiple loads comprising one load of data and N additional loads of data, the N additional loads of data being in addition to the one load of data, the one load being associated with the at least one column, the N additional loads respectively associated with the N sets of columns, the one load configured to generate or modify one or more rows of one table in the database, the one table comprising a column serving as a primary key in association with the at least one column, the N additional loads configured to generate or modify one or more rows in each table of N additional tables in the database, the N additional tables being in addition to the one table, the N additional tables being respectively associated with the N additional loads, each table of the N additional tables comprising a column serving as a foreign key with respect to the primary key of the one table.

2. The method of claim 1,
wherein, in each row of the plurality of rows, each column of no less than one column in each set of columns of the N sets of columns is independently linked to the at least one column by a data link contained in cells located at an intersection of each row of the plurality of rows with each column of the no less than one column in each set of columns of the N sets of columns, and
wherein the one or more rows of each additional table in the database respectively correspond to the cells containing the data link in the no less than one column in the respective set of columns of the N sets of columns.

3. The method of claim 1, the method further comprising:
the one or more processors determining that the unique data of the at least one column in one row of the template is dependent upon data pertaining to another column comprised by the N sets of columns and that the data pertaining to the other column does not exist in the database;
the one or more processors determining that another row of the template comprises the data pertaining to the other column and appears after the one row in the template; and
in response to the determining that the other row comprises the data pertaining to the other column and appears after the one row in the template, the one or more processors reordering the rows of the template resulting in the one row appearing after the other row in the template.

4. The method of claim 1, the method further comprising:
the one or more processors determining that the unique data of the at least one column in one row of the template is dependent upon data required by another column comprised by the N sets of columns and that the data pertaining to the other column does not exist in the database;
the one or more processors determining that another data load is currently scheduled to be executed to load the data pertaining to the other column into the database; and
in response to the determining that the other data load is currently scheduled to be executed to load the data pertaining to the other column into the database, the one or more processors scheduling execution of the multiple loads to occur after the other data load has been executed.

5. The method of claim 4, the method further comprising:
the one or more processors determining that the other data load is no longer scheduled to be executed and has not been executed, and that there is no additional data load currently scheduled to be executed to load the data pertaining to the other column into the database; and
in response to having determined that the other data load is no longer scheduled to be executed and has not been executed, and that there is no additional data load currently scheduled to be executed to load the data pertaining to the other column into the database, the one or more processors suspending the scheduling of execution of the multiple loads.

6. The method of claim 5, the method further comprising:
after the suspending, the one or more processors ascertaining whether the data pertaining to the other column has been added to the database within a specified period of time after the suspending, or there is a pending data load currently scheduled to be executed to load the data pertaining to the other column into the database;
if the ascertaining ascertains that the data pertaining to the other column has been added to the database within the specified period of time after the suspending, or there is a pending data load currently scheduled to be executed to load the data pertaining to the other column into the database, then the one or more processors restoring the scheduling of execution of the multiple loads;
if the ascertaining ascertains that the data pertaining to the other column has not been added to the database within the specified period of time after the suspending and that there is no pending data load currently scheduled to be executed to load the data pertaining to the other column into the database, then the one or more processors cancelling the execution of the multiple loads.

7. The method of claim 1, the method further comprising:
after the splitting, the one or more processors storing the multiple loads in respective multiple files, the multiple loads in the respective multiple files configured to be subsequently executed to load the data into the database, wherein the multiple files comprise one file corresponding to the one table and N additional files respectively corresponding to the N additional tables, wherein the N additional files are in addition to the one file, wherein the one file and each additional file comprise records and fields, wherein the fields of the one file correspond to respective columns of the one table, wherein the records of the one file correspond to respective rows of the one table, wherein the fields of each additional file correspond to respective columns of the respective additional table, and wherein the records of each additional file correspond to respective rows of the respective additional table.

8. The method of claim 7, the method further comprising:
after the storing, the one or more processors scheduling execution of the multiple loads such that the one load is to be executed before the N additional loads are executed; and
after the scheduling, the one or more processors executing the multiple loads in accordance with the scheduling, the executing comprising retrieving the multiple loads from the respective multiple files and executing the retrieved multiple loads in accordance with the scheduling to perform an action on the database, said action being selected from the group consisting of an Add action that inserts into the database at least one new record that does not currently exist in the database, a Change action that changes at least one existing record in the database, and an AddChange action that implements both said Add action and said Change action.

9. The method of claim 1, wherein the data template is a spreadsheet.

10. A computer program product, the computer program product comprising:

a computer readable hardware storage device storing program code which, upon being executed by one or more processors of a computer system, implement a method for processing a data load, said program code comprising:

program instructions to receive a request for a data load to load data into a database in accordance with a template that includes information to be loaded from the template into the database, wherein the data to be loaded into the database comprises the information to be loaded from the template into the database, the template comprising a plurality of columns and a plurality of rows, the request specifying a request type that is characterized by at least one column of the plurality of columns, the at least one column collectively including unique data for each row of the plurality of rows, the plurality of columns comprising N sets of columns in addition to the at least one column, N being a positive integer of at least 1; and program instructions to split the requested data load into multiple loads of data, the multiple loads comprising one load of data and N additional loads of data, the N additional loads of data being in addition to the one load of data, the one load being associated with the at least one column, the N additional loads respectively associated with the N sets of columns, the one load configured to generate or modify one or more rows of one table in the database, the one table comprising a column serving as a primary key in association with the at least one column, the N additional loads configured to generate or modify one or more rows in each table of N additional tables in the database, the N additional tables being in addition to the one table, the N additional tables being respectively associated with the N additional loads, each table of the N additional tables comprising a column serving as a foreign key with respect to the primary key of the one table.

11. The computer program product of claim 10, wherein, in each row of the plurality of rows, each column of no less than one column in each set of columns of the N sets of columns is independently linked to the at least one column by a data link contained in cells located at an intersection of each row of the plurality of rows with each column of the no less than one column in each set of columns of the N sets of columns, and wherein the one or more rows of each additional table in the database respectively correspond to the cells containing the data link in the no less than one column in the respective set of columns of the N sets of columns.

12. The computer program product of claim 10, the program code further comprising:

program instructions to determine that the unique data of the at least one column in one row of the template is dependent upon data pertaining to another column comprised by the N sets columns and that the data pertaining to the other column does not exist in the database;

program instructions to determine that another row of the template comprises the data pertaining to the other column and appears after the one row in the template; and program instructions, in response to a determination that the other row comprises the data pertaining to the other column and appears after the one row in the template, to reorder the rows of the template resulting in the one row appearing after the other row in the template.

13. The computer program product of claim 10, the program code further comprising:

program instructions to determine that the unique data of the at least one column in one row of the template is dependent upon data required by another column comprised by the N sets of columns and that the data pertaining to the other column does not exist in the database;

program instructions to determine that another data load is currently scheduled to be executed to load the data pertaining to the other column into the database; and program instructions to, in response to a determination that the other data load is currently scheduled to be executed to load the data pertaining to the other column into the database, schedule execution of the multiple loads to occur after the other data load has been executed.

14. The computer program product of claim 13, the program code further comprising:

program instructions to determine that the other data load is no longer scheduled to be executed and has not been executed, and that there is no additional data load currently scheduled to be executed to load the data pertaining to the other column into the database; and program instructions to, in response a determination that the other data load is no longer scheduled to be executed and has not been executed, and that there is no additional data load currently scheduled to be executed to load the data pertaining to the other column into the database, suspend scheduling of execution of the multiple loads.

15. The computer program product of claim 14, the program code further comprising:

program instructions to, after scheduling execution of the multiple loads have been suspended, ascertain whether the data pertaining to the other column has been added to the database within a specified period of time after the multiple loads have been suspended, or there is a pending data load currently scheduled to be executed to load the data pertaining to the other column into the database;

program instructions to, if it is ascertained that the data pertaining to the other column has been added to the database within the specified period of time after the multiple loads have been suspended, or there is a pending data load currently scheduled to be executed to load the data pertaining to the other column into the database, restore the scheduling of execution of the multiple loads; and program instructions to, if it is ascertained that the data pertaining to the other column has not been added to the database within the specified period of time after the multiple loads have been suspended, and there is no pending data load currently scheduled to be executed to load the data pertaining to the other column into the database, cancel the scheduling of execution of the multiple loads.

16. The computer program product of claim 10, the program code further comprising:

program instructions to, after the requested data load has been split into multiple loads of data, store the multiple loads in respective multiple files, the multiple loads in the respective multiple files configured to be subsequently executed to load the data into the database, wherein the multiple files comprise one file corresponding to the one table and N additional files respectively corresponding to the N additional tables, wherein the N additional files are in addition to the one file, wherein the one file and each additional file comprise records and fields, wherein the fields of the one file correspond to respective columns of the one table, wherein the records of the one file correspond to respective rows of the one table, wherein the fields of each additional file correspond to respective columns of the respective additional table, and wherein the records of each additional file correspond to respective rows of the respective additional table.

17. The computer program product of claim 10, the program code further comprising:
program instructions to, after the multiple loads have been stored in respective multiple files, schedule execution of the multiple loads such that the one load is to be executed before the N additional loads are executed; and
program instructions to, after execution of the multiple loads has been scheduled, execute the multiple loads in accordance with the scheduling of the multiple loads, wherein to execute comprises to retrieve the multiple loads from the respective multiple files and to execute the retrieved multiple loads in accordance with the scheduling to perform an action on the database, said action being selected from the group consisting of an Add action that inserts into the database at least one new record that does not currently exist in the database, a Change action that changes at least one existing record in the database, and an AddChange action that implements both said Add action and said Change action.

18. A method for loading data, the method comprising:
one or more processors receiving a request to load the data into a database, the data appearing in a plurality of columns and a plurality of rows of a first table; and
the one or more processors determining that a field defined by an intersection of one of the columns and one of the rows is dependent upon data in a different column in the first table, and that the data in the different column does not currently exist in the database;
the one or more processors determining that a data load is currently scheduled to be executed to load the data in the different column into the database; and
the one or more processors scheduling the loading of the data into the database to occur after the data load has been executed;
in response to having determined that the data load is no longer scheduled to be executed and has not been executed, and that there is no additional data load currently scheduled to be executed to load the data in the different column into the database, the one or more processors suspending the scheduling of the loading of the data into the database;
after the suspending, the one or more processors ascertaining whether the data in the different column has been added to the database within a specified period of time after the suspending, or there is a pending data load currently scheduled to be executed to load the data in the different column into the database;
if the ascertaining ascertains that the data in the different column has been added to the database within the specified period of time after the suspending, or that there is a pending data load currently scheduled to be executed to load the data in the different column into the database, then the one or more processors restoring the scheduling of the loading of the data into the database;
if the ascertaining ascertains that the data in the different column has been not been added to the database within the specified period of time after the suspending and that there is no pending data load currently scheduled to be executed to load the data in the different column into the database, then the one or more processors cancelling the scheduling of the loading of the data into the database.

* * * * *